Jan. 9, 1940.  S. A. SNELL  2,186,559
JUVENILE VEHICLE BODY
Original Filed March 15, 1937
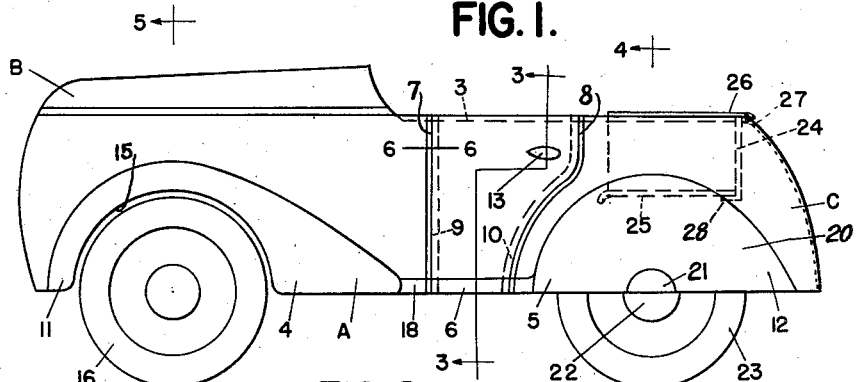
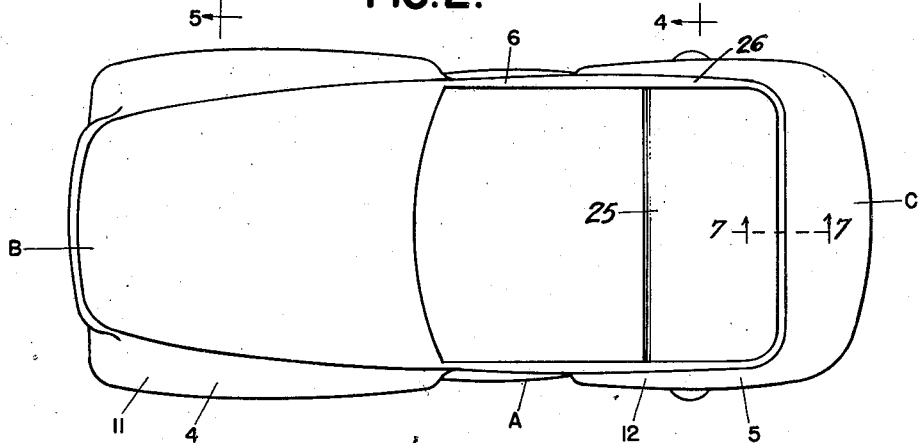
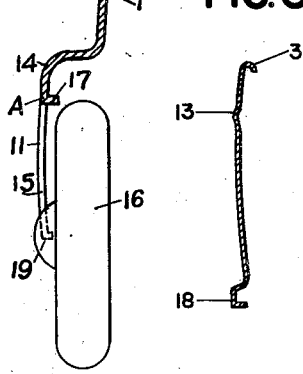
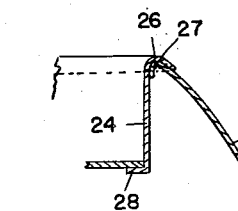
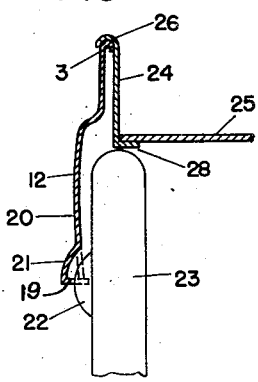
*INVENTOR*
SAMUEL A. SNELL
BY
*ATTORNEYS*

Patented Jan. 9, 1940

2,186,559

UNITED STATES PATENT OFFICE 2,186,559

JUVENILE VEHICLE BODY

Samuel A. Snell, Toledo, Ohio, assignor to The American-National Company, Toledo, Ohio, a corporation of Ohio Original application March 15, 1937, Serial No. 131,101. Divided and this application July 31, 1937, Serial No. 156,789

12 Claims. (Cl. 280—87.01)

This invention relates generally to juvenile vehicle bodies and constitutes a division of my application filed March 15, 1937, bearing Serial No. 131,101 now Patent No. 2,145,896, dated Feb. 7, 1939.

One of the essential objects of the present invention is to provide a body that can be manufactured entirely from sheet metal stampings and that will effectively withstand the stresses and strains to which it is subjected while in use.

Another object is to provide a body of the type mentioned that is comparatively light in weight and is attractive and pleasing in appearance.

Another object is to provide a body that can be manufactured in large quantities at a comparatively low cost.

Other objects, advantages and novel details of construction of this invention will be made more apparent as this description proceeds, especially when considered in connection with the accompanying drawing, wherein:

Figure 1 is a side elevation of a juvenile vehicle body embodying my invention;

Figure 2 is a top plan view of the body illustrated in Figure 1;

Figure 3 is a sectional view taken on the line 3—3 of Figure 1;

Figure 4 is a sectional view taken on the line 4—4 of Figure 1;

Figure 5 is a sectional view taken on the line 5—5 of Figure 1;

Figure 6 is a sectional view taken on the line 6—6 of Figure 1;

Figure 7 is a sectional view taken on the line 7—7 of Figure 2.

Referring now to the drawing, A are the sides, B is the hood, and C is the rear deck of a juvenile automobile body made in accordance with my invention. As shown, all of the elements mentioned are formed from sheet metal and are permanently and rigidly united together. Preferably, the sides A are provided at their forward upper edges with inturned substantially flat flanges 1 to which similarly inturned substantially flat flanges 2 of the hood B are secured and are provided at their upper edges in rear of said hood with inwardly projecting flanges 3 of inverted U-cross section. In the present instance, the sides A have forward sections 4, rear sections 5, and intermediate sections 6 rigidly secured together. Preferably the front and rear sections 4 and 5 are provided at their adjacent edges with outwardly embossed strip-like portions 7 and 8, respectively, that form frame-like abutments for the upright edges of the intermediate section 6. Portions 9 and 10 of the front and rear sections 4 and 5 between these border portions 7 and 8 constitute attaching flanges for the intermediate section 6. As shown, the forward and rear sections 4 and 5 have outwardly embossed portions 11 and 12 of inverted L-cross section forming front and rear fenders, while the intermediate sections 6 simulate doors and have elongated embossed portions 13 simulating door latch handles. Preferably the vertical portions 14 of the front fenders are provided with openings 15 to permit the front wheels 16 of the automobile to turn, and the metal at the edges of said openings is bent inwardly to provide substantially flat stiffening flanges 17. To further stiffen and reinforce the structure, the metal of the sides A between the front and rear fenders 11 and 12 is bent outwardly, downwardly and thence inwardly to provide inwardly opening channels 18, and the metal of said sides in front and in rear of said channels 18 is bent inwardly at the lower edges of said sides to provide inwardly projecting substantially flat flanges 19. Inasmuch as the vertical portions 20 of the rear fenders are devoid of openings such as 15, such vertical portions are preferably embossed outwardly as at 21 to afford proper clearance for the hub caps 22 of the rear wheels 23 of the automobile. If desired, upright stampings 24 and a horizontal stamping 25 may be provided at the rear end of the body to constitute a seat for a child or rider of the automobile. As shown, these upright stampings 24 are provided at their upper ends with outturned flanges 26 of inverted U-configuration that overlap and are secured to the inturned flanges 3 and 27, respectively, of the sides and rear deck, and are provided at their lower ends with substantially flat inturned flanges 28 that form supports for the horizontal stamping 25.

In the process of construction, the hood B is formed separately from the sides A. Likewise, the intermediate door sections 6 are formed separately from the front and rear sections 4 and 5 of said sides.

In the present instance the size of the sections 6 determines the length of the juvenile body when completed. Consequently, as inserts of various sizes may be used, it is possible by their use to provide juvenile automobile bodies of different length.

What I claim as my invention is:

1. A juvenile vehicle body of the type in which a child rides having upright pressed metal side panels and a rear deck, the metal of the side panels and deck being provided at their upper edges with lateral flanges, a horizontal seat stamping between and free of said side panels, and supporting upright stampings having flanges underlying and secured to said seat stamping and overlying and secured to the lateral flanges aforesaid.

2. A juvenile vehicle body of the type in which a child rides having upright pressed metal side panels and a rear deck, the metal of the side panels being provided at their upper edges with inturned flanges, a horizontal seat stamping between and free of said side panels, and supporting upright stampings substantially parallel to said upright side panels and having flanges underlying and secured to said seat stamping and overlying and secured to the inturned flanges aforesaid.

3. A juvenile vehicle body of the type in which a child rides having laterally spaced upright pressed metal side panels and a rear deck, a substantially horizontal seat panel between and free of said side panels, and supporting means for said seat suspended from and rigid with the upper edges of said side panels and deck.

4. A juvenile vehicle body of the type in which a child rides having upright side panels having lateral flanges, a horizontal seat stamping between and free of said side panels, and supporting upright stampings having flanges respectively underlying and secured to said seat stamping and overlying and secured to the lateral flanges aforesaid.

5. A juvenile vehicle body of the type in which a child rides having upright pressed metal side panels having inturned flanges, a horizontal seat stamping between and free of said side panels, and supporting upright stampings substantially parallel to said upright side panels and having flanges underlying and secured to said seat stamping and overlying and secured to the inturned flanges aforesaid.

6. A juvenile vehicle body having laterally spaced upright pressed metal side panels and a rear deck, a substantially horizontal seat between and free of said side panels, flanges projecting laterally from said side panels at the upper edges thereof, and supporting means for said seat including means rigid with and suspended from said lateral flanges.

7. A juvenile vehicle body of the type in which a child rides having upright pressed metal side panels and a rear deck, a horizontal seat stamping between said side panels, and supporting upright stampings secured to said seat stamping and overlying and secured to the upper edges of said rear deck.

8. A juvenile vehicle body of the type in which a child rides having upright pressed metal side panels and a rear deck, a horizontal seat stamping between said side panels, and supporting upright stampings substantially parallel to said upright side panels and having flanges underlying and secured to said seat stamping and overlying and secured to the upper edges of said deck.

9. A juvenile vehicle body of the type in which a child rides having laterally spaced upright pressed metal side panels and a rear deck, a seat stamping between and free of said side panels and means supporting said seat stamping from the upper edges of said deck including another stamping rigidly secured to the underside of the seat stamping and rigidly secured to the upper edges of said deck.

10. A juvenile vehicle body of the type in which a child rides having laterally spaced upright side panels, a horizontal seat stamping between and free of said side panels, and means for supporting said seat stamping from the upper edges of said side panels, including an upright stamping rigidly secured at its lower end to said seat stamping and rigidly secured at its upper end to the side panels at their upper edges, said upright stamping forming a back for said seat.

11. A juvenile vehicle body of the type in which a child rides having a substantially U-shaped portion forming an end of the body, a seat stamping between and free of the sides of said U-shaped portion, the back and sides of said U-shaped portion having lateral flanges, and supporting means for said seat stamping suspended from said lateral flanges, a portion of said supporting means forming a back for the seat and being rigidly secured to said seat stamping and to said lateral flanges.

12. A juvenile vehicle body of the type in which a child rides having a substantially U-shaped portion forming an end of the body, a seat stamping between and free of the sides of said U-shaped portion, the back and sides of said U-shaped portion having lateral flanges, and supporting stampings rigid with said lateral flanges and rigidly secured to said seat stamping, one of said supporting stampings forming a back for said seat.

SAMUEL A. SNELL.